US009423918B2

(12) United States Patent
Kang et al.

(10) Patent No.: US 9,423,918 B2
(45) Date of Patent: Aug. 23, 2016

(54) ELECTROSTATIC CAPACITIVE TOUCH SCREEN PANEL

(71) Applicant: LG Display Co., Ltd., Seoul (KR)

(72) Inventors: Sungjin Kang, Gyeonggi-do (KR); Jonghyun Han, Gyeonggi-do (KR); Jaegyun Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 14/548,525

(22) Filed: Nov. 20, 2014

(65) Prior Publication Data

US 2015/0185916 A1 Jul. 2, 2015

(30) Foreign Application Priority Data

Dec. 30, 2013 (KR) ........................ 10-2013-0166738

(51) Int. Cl.
*G06F 3/044* (2006.01)
(52) U.S. Cl.
CPC ..................................... *G06F 3/044* (2013.01)
(58) Field of Classification Search
None
See application file for complete search history.

(56) References Cited

U.S. PATENT DOCUMENTS

| | | | | |
|---|---|---|---|---|
| 9,151,790 | B1* | 10/2015 | Hoshtanar | G01R 27/2605 |
| 2012/0187956 | A1* | 7/2012 | Uzelac | G01R 31/28 |
| | | | | 324/537 |
| 2014/0049271 | A1* | 2/2014 | Trend | G01R 27/2605 |
| | | | | 324/663 |
| 2014/0084992 | A1* | 3/2014 | Chen | G06F 3/0412 |
| | | | | 327/517 |
| 2015/0002752 | A1* | 1/2015 | Shepelev | G06F 3/044 |
| | | | | 349/12 |
| 2015/0091865 | A1* | 4/2015 | Funayama | G06F 3/044 |
| | | | | 345/174 |

* cited by examiner

*Primary Examiner* — Ryan A Lubit
(74) *Attorney, Agent, or Firm* — Morgan, Lewis & Bockius LLP

(57) ABSTRACT

An electrostatic capacitive touch screen panel includes a plurality of first touch electrodes divided in a first direction and a second direction crossing the first direction; a plurality of second touch electrodes disposed between first touch electrodes neighboring in the first direction and extending in the second direction; and a plurality of grounding/floating electrodes disposed between the first touch electrodes and second touch electrodes arranged in the second direction and extending in the second direction.

9 Claims, 5 Drawing Sheets

G1, G3 : floating
G2, G4 : ground

G1, G3 : floating
G2, G4 : ground

ELECTROSTATIC CAPACITIVE TOUCH SCREEN PANEL

This application claims the benefit of priority under 35 U.S.C. §119(a) to Korean Patent Application No. 10-2013-0166738 filed on Dec. 30, 2013, which is incorporated by reference herein in its entirety.

BACKGROUND OF THE INVENTION

1. Field of the Invention

The present invention relates to an electrostatic capacitive touch screen panel.

2. Discussion of the Related Art

In recent years, display devices, such as a liquid crystal display, an electroluminescent display, and a plasma display panel, having a quick response speed, low power consumption, and an excellent color reproduction rate, have been in the spotlight. These display devices have been used for various electronic products such as a television, a monitor for a computer, a laptop computer, a mobile phone, a display unit of a refrigerator, a personal digital assistant, and an automated teller machine. In general, these display devices interface with various input devices such as a keyboard, a mouse, and a digitizer. However, such input devices as a keyboard, a mouse, etc require the user to learn to use them and take up space, thus making it difficult to improve the completeness of the products. Therefore, the demand for input devices that are convenient and easy to use and reduce erroneous operations is growing more and more. In response to this demand, a touch screen panel for enabling a user to input information by directly touching the screen with their hand or a pen was suggested.

The touch screen panel has a simple configuration and has fewer malfunctions. Also, the user can perform an input action without using a separate input device and quickly and easily manipulate the touch screen panel through content displayed on the screen. Accordingly, the touch screen panel is being applied to various display devices.

Hereinafter, a related art electrostatic capacitive touch screen panel will be described with reference to FIGS. 1 and 2. FIG. 1 is a plan view showing a related art electrostatic capacitive touch screen panel. FIG. 2 is a plan view showing a dead zone on the related art electrostatic capacitive touch screen panel where touch recognition is impossible.

With reference to FIG. 1, the related art electrostatic capacitive touch screen panel comprises a panel portion PN with touch electrodes, routing wires, and grounding electrodes formed in a single layer, i.e., the same layer, and a flexible printed circuit board FPCB connected to one side of the panel portion PN and having wires for sending and receiving signals to and from the routing wires.

The touch electrodes of the panel portion PN are formed on a substrate SUB. The panel portion PN comprises a plurality of first touch electrodes Tx11, Tx12, Tx21, Tx22, Tx31, and Tx32 divided in a first direction (e.g., x-axis direction, i.e., row direction) and a second direction (e.g., y-axis direction, i.e., column direction) crossing the first direction, a plurality of 2-1 and 2-2 touch electrodes Rx1 and Rx2 disposed on one side of the 1-1 and 1-2 touch electrodes Tx11, Tx21 and Tx31; and Tx12, Tx22 and Tx32 along the column direction, and first and second grounding electrodes G1 and G2 disposed on the other side of the 1-1 and 1-2 touch electrodes Tx11, Tx21 and Tx31; and Tx12, Tx22 and Tx32 along the column direction.

The routing wires of the panel portion PN comprise 1-1 main routing wires TW11a, TW21a, and TW31a which are disposed between the 1-1 touch electrodes Tx11, Tx21, and Tx31 of the first column and the first grounding electrode G1 and respectively connected to the 1-1 touch electrodes Tx11, Tx21, and Tx31 of the first column and extend in the second direction, and 1-2 main routing wires TW12a, TW22a, and TW32a which are disposed between the 1-2 touch electrodes Tx12, Tx22, and Tx32 of the second row and the second grounding electrode G2 and respectively connected to the 1-2 touch electrodes Tx12, Tx22, and Tx32 of the second column and extend in the second direction.

The routing wires of the panel portion PN further comprise a 2-1 main routing wire RW1a connected to the 2-1 touch electrode Rx1 of the first column and extending in the second direction, and a 2-2 main routing wire RW2a connected to the 2-2 touch electrode Rx2 of the second column and extending in the second direction.

The routing wires of the panel portion PN further comprise a first main grounding wire GW1a connected to the first grounding electrode G1 and extending in the second direction, and a second main grounding wire GW2a connected to the second grounding electrode G2 and extending in the second direction.

The flexible printed circuit board FPCB comprises 1-1 sub routing wires TW11b, TW21b, and TW31b attached to one side of the panel portion PN and respectively connected to the 1-1 main routing wires TW11a, TW21a, and TW31a, 1-2 sub routing wires TW12b, TW22b, and TW32b respectively connected to the 1-2 main routing wires TW12a, TW22a, and TW32a, 1-1 to 1-3 connecting wires TW1c, TW2c, and TW3c connecting the 1-1 sub routing wires TW11b, TW21b, and TW31b to the 1-2 sub routing wires TW12b, TW22b, and TW32b, and 1-1 to 1-3 signal wires TW1, TW2, and TW3 respectively connected to the 1-1 to 1-3 connecting wires TW1c, TW2c, and TW3c and extending to the edge of the flexible printed circuit board FPCB.

The flexible printed circuit board FPCB further comprises a 2-1 signal wire RW1 connected to the 2-1 main routing wire RW1a and extending to the edge of the flexible printed circuit board FPCB, and a 2-2 signal wire RW2 connected to the 2-2 main routing wire RW2a and extending to the edge of the flexible printed circuit board FPCB.

The flexible printed circuit board FPCB further comprises a first sub grounding wire GW1b connected to the first main grounding wire GW1a, a second sub grounding wire GW2b connected to the second main grounding wire GW2a and extending to the edge of the flexible printed circuit board FPCB.

The related art electrostatic capacitive touch screen panel with the above-described configuration detects a touch position by supplying touch driving signals to the 1 touch electrodes Tx11 and Tx12 of the first row, the 1 touch electrodes Tx21 and Tx22 of the second row, and the 1 touch electrodes Tx31 and Tx32 of the third row, sensing the 2-1 and 2-2 touch electrodes Rx1 and Rx2, and calculating a change before and after a touch in the mutual capacitance occurring between the 1 touch electrodes Tx11, Tx21, Tx31 and 2-1 touch electrodes Rx1, and the 1 touch electrodes Tx12, Tx22, Tx32 and the 2-2 touch electrode Rx2.

The related art electrostatic capacitive touch screen panel has the advantage of ease of manufacture because it has a single layer structure; however, it requires first and second grounding electrodes G1 and g2 for separating the 1-1 and 1-2 main routing wires TW11a, TW12a and TW31a; and TW12a, TW22a and TW32a because the first touch electrodes and the second touch electrodes must be formed in the same layer, as shown in FIG. 2.

By the way, no mutual capacitance occurs between the first touch electrodes Tx11, Tx21, and Tx31 and the second touch electrode Rx2, which lie on either side of the first grounding electrode G1, due to the first and second grounding electrodes G1 and G2. As such, when the user touches the space between the first touch electrodes Tx11, Tx21, and Tx31 and the second touch electrode Rx2, a dead zone occurs where a touch position cannot be precisely recognized.

SUMMARY OF THE INVENTION

Accordingly, the present invention is directed to an electrostatic capacitive touch screen panel that substantially obviates on or more of the problems due to limitations and disadvantages of the related art.

An object of the present invention is to provide an electrostatic capacitive touch screen panel that is capable of accurately recognizing a touch position in all areas without a dead zone.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposed of the present invention, as embodied and broadly described, an electrostatic capacitive touch screen panel comprises a plurality of first touch electrodes divided in a first direction and a second direction crossing the first direction; a plurality of second touch electrodes disposed between first touch electrodes neighboring in the first direction and extending in the second direction; and a plurality of grounding/floating electrodes disposed between the first touch electrodes and second touch electrodes arranged in the second direction and extending in the second direction.

It is to be understood that both the foregoing general description and the following detailed description are exemplary and explanatory and are intended to provided further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
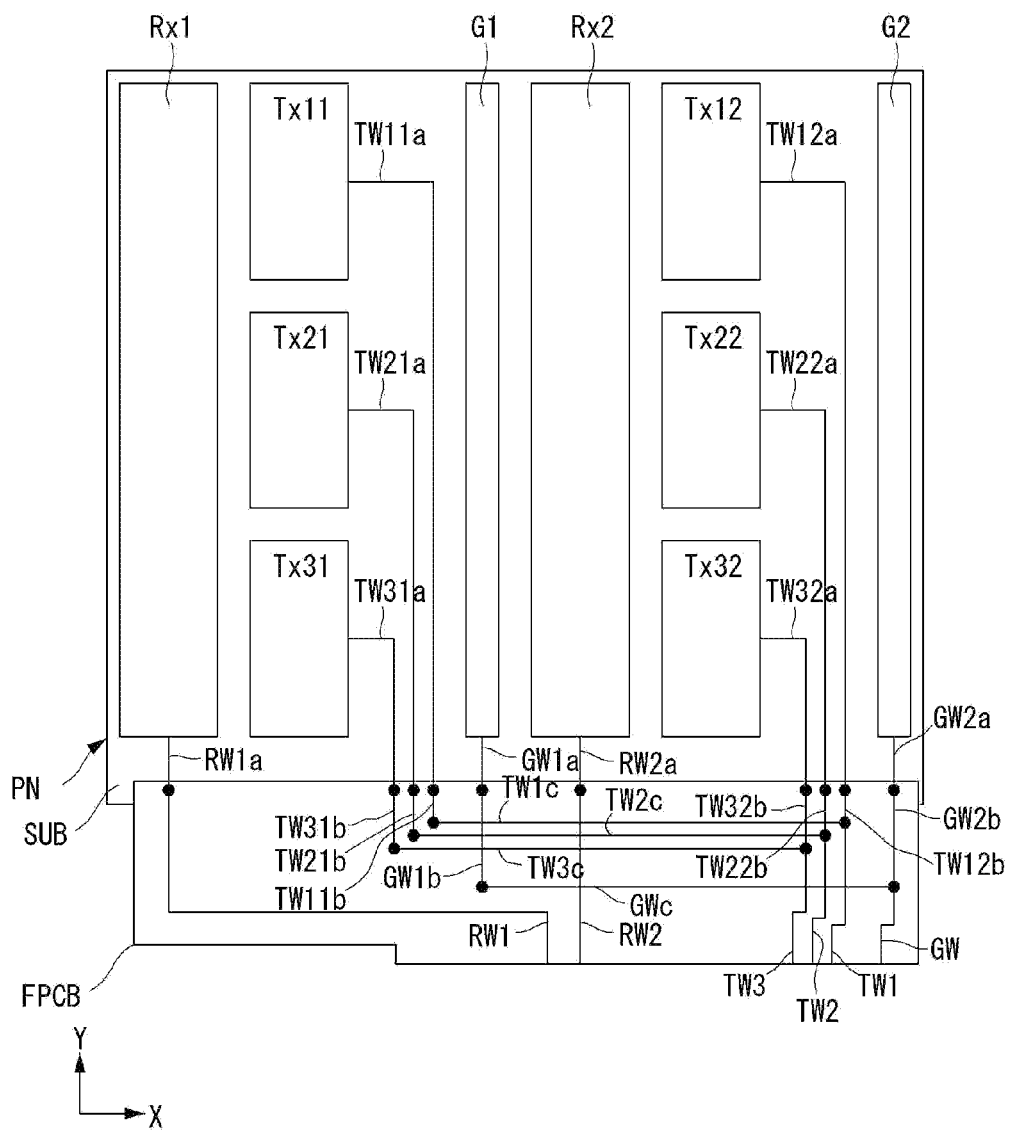
FIG. 1 is a plan view showing a related art electrostatic capacitive touch screen panel.
Figure 2:
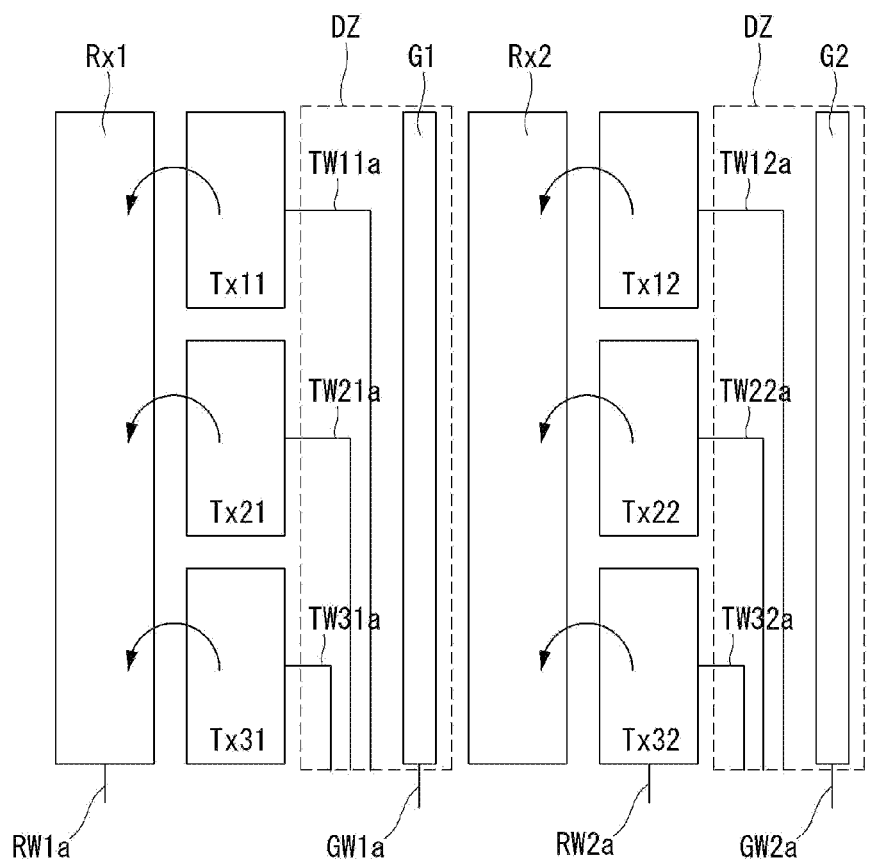
FIG. 2 is a plan view showing a dead zone on the related art electrostatic capacitive touch screen panel where touch recognition is impossible.

Reference will now be made in detail to the preferred embodiments of the present invention, examples of which are illustrated in the accompanying drawings. Same reference numerals may be used to denote the same or substantially the same elements throughout the specification and the drawings.

Figure 3:
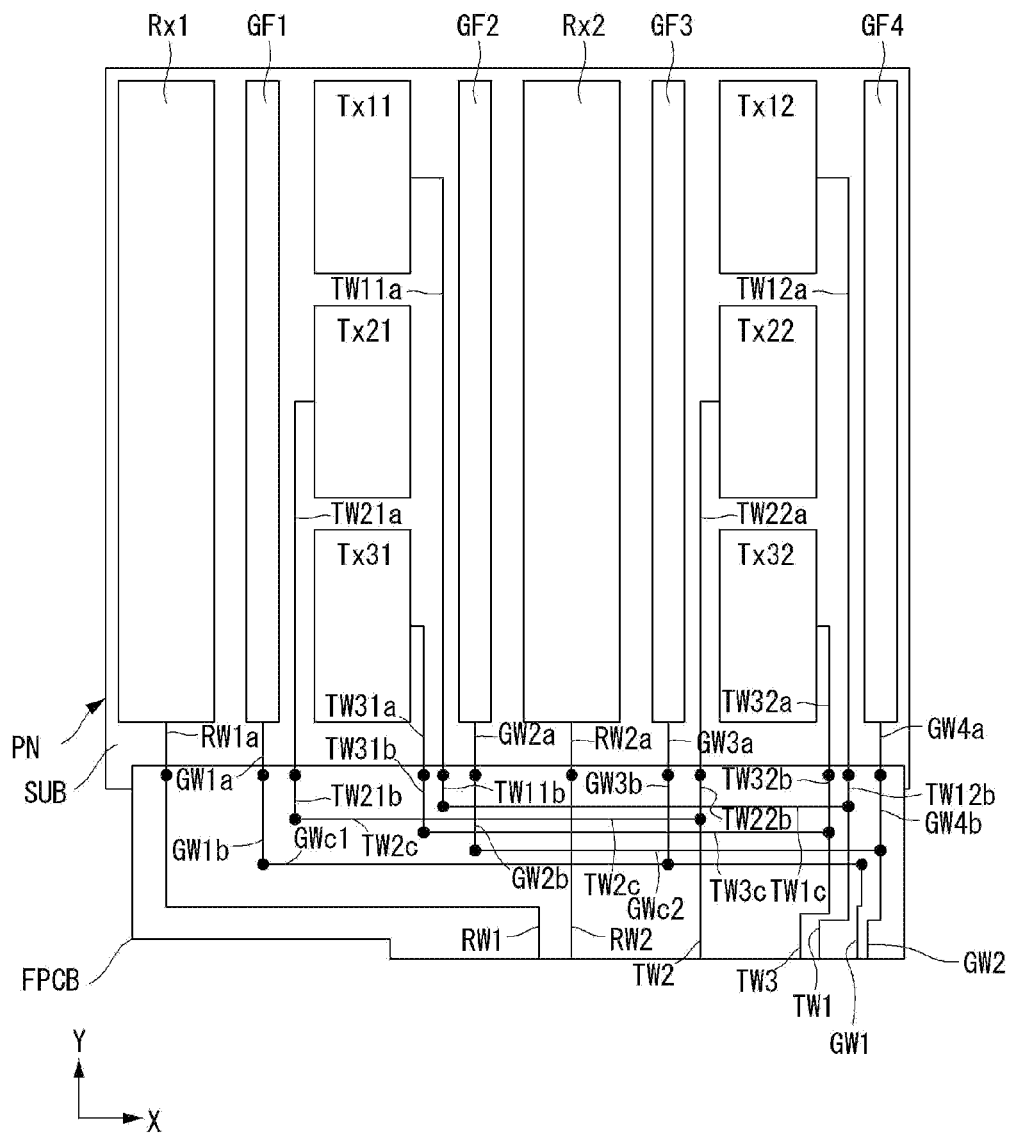
FIG. 3 is a plan view showing an electrostatic capacitive touch screen panel according to an exemplary embodiment of the present invention.

First of all, an electrostatic capacitive touch screen panel according to an exemplary embodiment of the present invention will be described with reference to FIG. 3. FIG. 3 is a plan view showing an electrostatic capacitive touch screen panel according to an exemplary embodiment of the present invention.

With reference to FIG. 3, the electrostatic capacitive touch screen panel according to the exemplary embodiment of the present invention comprises a panel portion PN with touch electrodes, routing wires, and grounding/floating electrodes formed in a single layer, i.e., the same layer, and a flexible printed circuit board FPCB connected to one side of the panel portion PN and having wires for sending and receiving signals to and from the routing wires.

The touch electrodes of the panel portion PN are formed on a substrate SUB, and the panel portion PN comprises a plurality of first touch electrodes Tx11, Tx12, Tx21, Tx22, Tx31, and Tx32 divided in a first direction (e.g., x-axis direction, i.e., row direction) and a second direction (e.g., y-axis direction, i.e., column direction), crossing the first direction, first to fourth grounding/floating electrodes GF1 to GF4 disposed on either side of the 1-1 and 1-2 touch electrodes Tx11, Tx21 and Tx31; and Tx12, Tx22 and Tx32 along the column direction, a 2-1 touch electrode Rx1 disposed in the column direction on the lateral side of the first grounding/floating electrode GF1 disposed on the outermost part, and a 2-2 touch electrode Rx2 disposed in the column direction between the second and third grounding/floating electrodes GF2 and GF3 neighboring each other.

Although the exemplary embodiment illustrated in FIG. 3 has been described that the 2-1 touch electrode Rx1 is formed on the leftmost part of the panel portion PN and the fourth grounding/floating electrode GF4 is disposed on the rightmost part of the panel portion PN, a 2-3 touch electrode may be added on the right side of the fourth grounding/floating electrode GF4 or the 2-1 touch electrode may be removed.

The routing wires of the panel portion PN comprise a 1-1a main routing wire TW21a which is disposed between the 1-1 touch electrodes Tx11, Tx21, and Tx31 of the first column and the first grounding/floating electrode GF1 and connected to the odd- or even-numbered 1-1 touch electrode Tx21 (even-numbered one in this exemplary embodiment of the present invention) of the first column and extends in the second direction, and 1-1b main routing wires TW11a and TW31a which are disposed between the 1-1 touch electrodes Tx11, Tx21, and Tx31 of the first column and the second grounding/floating electrode GF2 and connected respectively to the even- or odd-numbered 1-1 touch electrodes Tx11 and Tx31 (odd-numbered ones in this exemplary embodiment of the present invention) and extend in the second direction. Hereinafter, the 1-1a main routing wire and the 1-1b main routing wires may be collectively referred to as the 1-1 main routing wires as necessary.

The routing wires of the panel portion PN further comprise a 1-2a main routing wire TW22a which is disposed between the 1-2 touch electrodes Tx12, Tx22, and Tx32 of the second column and the third grounding/floating electrode GF3 and connected to the odd- or even-numbered 1-2 touch electrode Tx22 (even-numbered one in this exemplary embodiment of the present invention) of the second column and extends in the second direction, and 1-2b main routing wires TW12a and TW32a which are disposed between the 1-2 touch electrodes Tx12, Tx22, and Tx32 of the second column and the fourth grounding/floating electrode GF4 and connected respectively to the even- or odd-numbered 1-2 touch electrodes Tx12 and Tx32 (odd-numbered ones in this exemplary embodiment of the present invention) and extend in the second direction. Hereinafter, the 1-2a main routing wire and the 1-2b main routing wires may be collectively referred to as the 1-2 main routing wires as necessary.

The routing wires of the panel portion PN further comprise a 2-1 main routing wire RW1a connected to the 2-1 touch electrode Rx1 of the first column and extending in the second direction, and a 2-2 main routing wire RW2a connected to the 2-2 touch electrode Rx2 of the second column and extending in the second direction.

The routing wires of the panel portion PN further comprise a first main grounding/floating wire GW1a connected to the first grounding/floating electrode GF1 and extending in the second direction, a second main grounding/floating wire GW2a connected to the second grounding/floating electrode GF2 and extending in the second direction, a third main grounding/floating wire GW3a connected to the third grounding/floating electrode GF3 and extending in the second direction, and a fourth main grounding/floating wire GW4a connected to the fourth grounding/floating electrode GF4 and extending in the second direction.

The flexible printed circuit board FPCB comprises 1-1 sub routing wires TW11b, TW21b, and TW31b attached to one side of the panel portion PN and connected respectively to the 1-1 main routing wires TW11a, TW21a, and TW31a, 1-2 sub routing wires TW12b, TW22b, and TW32b connected respectively to the 1-2 main routing wires TW12a, TW22a, and TW32a, 1-1 to 1-3 connecting wires TW1c, TW2c, and TW3c connecting the 1-1 sub routing wires TW11b, TW21b, and TW31b to the 1-2 sub routing wires TW12b, TW22b, and TW32b, and 1-1 to 1-3 signal wires TW1, TW2, and TW3 connected respectively to the 1-1 to 1-3 connecting wires TW1c, TW2c, and TW3c and extending to the edge of the flexible printed circuit board FPCB.

The flexible printed circuit board FPCB further comprises a 2-1 signal wire RW1 connected to the 2-1 main routing wire RW1a and extending to the edge of the flexible printed circuit board FPCB, and a 2-2 signal wire RW2 connected to the 2-2 main routing wire RW2a and extending to the edge of the flexible printed circuit board FPCB.

The flexible printed circuit board FPCB further comprises first to third sub grounding/floating wires GW1b and GW3b connected respectively to the odd-numbered first and third main grounding/floating wires GW1a and gW3a, a 2-1 connecting wire GWc1 interconnecting the odd-numbered first and third sub grounding/floating wires GW1b and GW3b, a first grounding/floating signal wire GW1 connected to the 2-1 connecting wire GWc1 and extending to the edge of the flexible printed circuit board FPCB, second and fourth sub grounding/floating wires GW2b and GW4b connected to the even-numbered second and fourth main grounding/floating wires GW2a and GW4a, a 2-2 connecting wire GWc2 interconnecting the even-numbered second and fourth sub grounding/floating wires GW2b and GW4b, and a second grounding/floating signal wire GW2 connected to the 2-2 connecting wire GWc2 and extending to the edge of the flexible printed circuit board FPCB.

The 2-1 connecting wire GWc1 and the 2-2 connecting wire GWc2 alternate between the ground state and the floating state under the control of a touch controller (not shown). That is, when the odd-numbered grounding/floating electrodes GF1 and GF3 are grounded under the control of the touch controller, the even-numbered grounding/floating electrodes GF2 and GF4 are allowed to float, and when the even-numbered grounding/floating electrodes GF2 and GF4 are grounded, the odd-numbered grounding/floating electrodes GF1 and GF3 are allowed to float.

The 1-1 and 1-2 sub routing wires TW11b, TW21b and TW21b; and TW12b, TW22b and TW32b, 1-1 to 1-3 signal wires TW1, TW2, and TW3, 2-1 and 2-2 signal wires RW11 and RW21, first to fourth sub grounding/floating wires GW1b, GW2b, GW3b, and GW4b, and first and second grounding/floating signal wires GW1 and GW2, which are formed on the flexible printed circuit board FPCB, are formed in the same layer. The 1-1 to 1-3 connecting wires TW1, TW2, and TW3 and the 2-1 and 2-2 connecting wires GWc1 and GWc2 may be formed in different layers with an insulation layer (not shown) interposed between them. In this case, the 1-1 to 1-3 connecting wires TW1, TW2, and TW3 may connect the 1-1 and 1-2 sub routing wires TW11b and TW12b; TW21b and TW22b; and TW31b and TW32b, respectively, through contact holes formed in the insulation layer, and the 2-1 and 2-2 connecting wires GWc1 and GWc2 may connect the odd-numbered sub grounding/floating wires GW1b and GW3b and the odd-numbered sub grounding/floating wires GW2b and GW4b, respectively, through contact holes formed in the insulation layer.

Figure 4A:
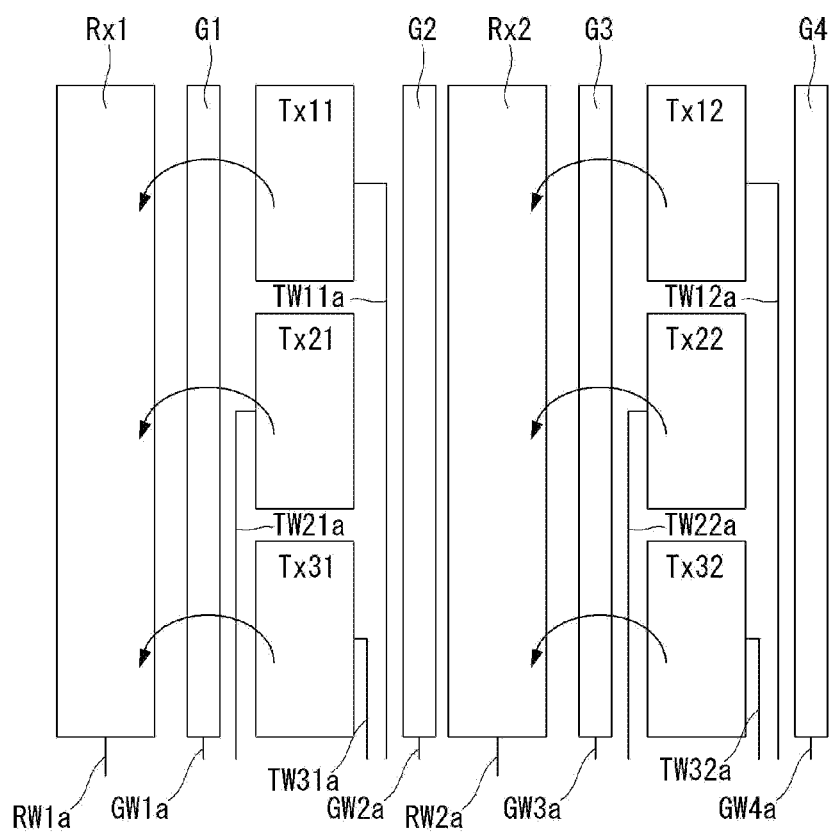
FIG. 4A is a plan view showing the mutual capacitance occurring when the odd-numbered first and third grounding/floating electrodes are allowed to float and the even-numbered second and fourth grounding/floating electrodes are grounded, under the control of the touch controller, in the electrostatic capacitive touch screen panel according to the exemplary embodiment of the present invention.
Figure 4B:
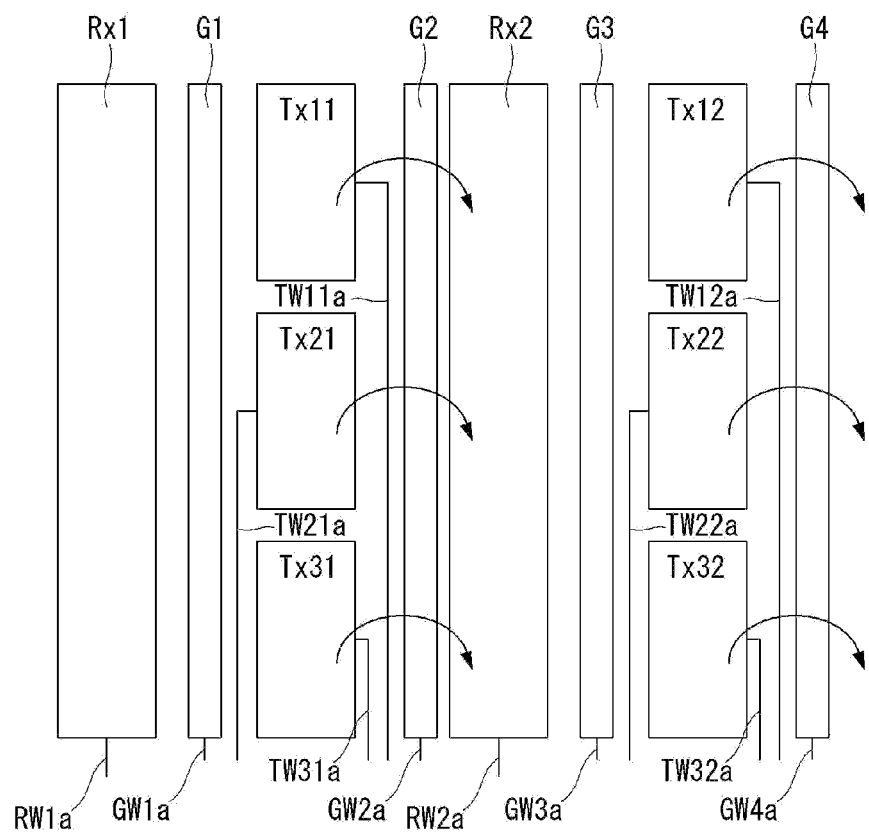
FIG. 4B is a plan view showing the mutual capacitance occurring when the even-numbered second and fourth grounding/floating electrodes are grounded and the odd-numbered first and third grounding/floating electrodes are allowed to float, under the control of the touch controller, in the electrostatic capacitive touch screen panel according to the exemplary embodiment of the present invention.

Next, the driving of the above-described electrostatic capacitive touch screen panel according to the exemplary embodiment of the present invention will be described with reference to FIGS. 4A and 4B. FIG. 4A is a plan view showing the mutual capacitance occurring when the odd-numbered first and third grounding/floating electrodes are allowed to float and the even-numbered second and fourth grounding/floating electrodes are grounded, under the control of the touch controller, in the electrostatic capacitive touch screen panel according to the exemplary embodiment of the present invention. FIG. 4B is a plan view showing the mutual capacitance occurring when the even-numbered second and fourth grounding/floating electrodes are grounded and the odd-numbered first and third grounding/floating electrodes are allowed to float, under the control of the touch controller, in the electrostatic capacitive touch screen panel according to the exemplary embodiment of the present invention.

With reference to FIGS. 4A and 4B, the electrostatic capacitive touch screen panel according to the exemplary embodiment of the present invention allows for the occurrence of high mutual capacitance between the first to fourth grounding/floating electrodes GF1 to GF4 and the second touch electrodes Rx1 and Rx2 without a dead zone by allowing the odd-numbered first and third grounding/floating electrodes GF1 and GF3 and the even-numbered second and fourth grounding/floating electrodes GF2 and GF4 to float alternately during one touch driving period.

With reference to FIGS. 3 and 4A, it is assumed that, for example, the first grounding/floating signal wire GW1 is connected to the 2-1 connecting wire GWc1 to allow the odd-numbered first and third grounding/floating electrodes GF1 and GF3 to float during the first half of one touch driving period under the control of the touch controller (not shown). Then, mutual capacitance occurs between the 2-1 touch electrode Rx1 and the 1-1 touch electrodes Tx11, Tx21, and Tx31 of the first column and between the 2-2 touch electrode Rx2 and the 1-2 touch electrodes Tx12, Tx22, and Tx32 of the second column, as shown in FIG. 4A. No mutual capacitance occurs between the 1-1 touch electrodes TX11, Tx21, and Tx31 and the 2-2 touch electrode Rx2 of the first column because the even-numbered second and fourth grounding/floating electrodes GF2 and GF4 are grounded.

Next, it is assumed that the second grounding/floating signal wire GW2 is connected to the 2-2 connecting wire GWc2 to allow the even-numbered second and fourth grounding/floating electrodes GF2 and GF4 to float during the second half of the touch driving period under the control of the touch controller (not shown). Then, mutual capacitance occurs between the 1-1 touch electrodes Tx11, Tx21, and Tx31 of the first column and the 2-2 touch electrode Rx2, as shown in FIG. 4B. Accordingly, it is possible to recognize a touch in all areas without a dead zone since mutual capacitance occurs between the 1-1 touch electrodes Tx11, Tx21, and Tx31 of the first column and the 2-2 touch electrode Rx2 where no mutual capacitance occurs when a first control signal SEL is supplied.

As described above, the touch screen panel according to the exemplary embodiment of the present invention has the advantage of recognizing a touch in all areas without a dead zone by disposing grounding/floating electrodes between first touch electrodes and second touch electrodes and allowing the odd-numbered grounding/floating electrodes and the even-numbered grounding/floating electrodes to float alternately during one touch driving period. That is, the touch controller connects the first grounding/floating signal and the 2-1 connecting wire during the first half of one touch driving period and connects the second grounding/floating signal wire and the 2-1 connecting wire during the second half of the touch driving period, thereby allowing for touch recognition in all area without a dead zone.

From the above description, it will be apparent to those skilled in the art that various changes and modifications can be made without departing from the technical spirit of the present invention. For instance, the number of first and second touch electrodes, the number of grounding/floating electrodes, and the number of wires connected to these electrodes that are given in the exemplary embodiment of the present invention are only illustrative and not limited to the examples given. Moreover, the outermost positions of the first and second touch electrodes and the layout of the connecting wires are not limited to those given in the exemplary embodiment but can be properly changed as necessary.

It will be apparent to those skilled in the art that various modifications and variations can be made in the electrostatic capacitive touch screen panel of the present invention without departing from the spirit or scope of the invention. Thus, it is intended that the present invention cover the modifications and variations of this invention provided they come within the scope of the appended claims and their equivalents.

What is claimed is:

1. An electrostatic capacitive touch screen panel, comprising:
    a plurality of first touch electrodes divided in a first direction and a second direction crossing the first direction;
    a plurality of second touch electrodes disposed between first touch electrodes neighboring in the first direction and extending in the second direction; and
    a plurality of grounding/floating electrodes disposed between the first touch electrodes and second touch electrodes arranged in the second direction and extending in the second direction,
    wherein a first subset of the plurality of the grounding/floating electrodes are floated in a first half of one touch driving period and grounded in a second half of the one touch driving period, and a second subset of the plurality of grounding/floating electrodes are grounded in the first half of one touch driving period and floated in the second half of the one touch driving period during user input.

2. The electrostatic capacitive touch screen panel of claim 1, wherein the first touch electrodes comprise 1-1 touch electrodes and 1-2 touch electrodes arranged in the second direction along the first direction,
    the 1-1 touch electrodes and the 1-2 touch electrodes are connected in the first direction, and
    when odd-numbered grounding/floating electrodes are allowed to float and even-numbered grounding/floating electrodes are grounded during the first half of one touch driving period, the odd-numbered grounding/floating electrodes are grounded and the even-numbered grounding/floating electrodes are allowed to float during the second half of the touch driving period.

3. The electrostatic capacitive touch screen panel of claim 1, wherein the first touch electrodes comprise 1-1 touch electrodes and 1-2 touch electrodes arranged in the second direction along the first direction, and
    the electrostatic capacitive touch screen panel further comprises 1-1 main routing wires respectively connected to the 1-1 touch electrodes, and 1-2 main routing wires respectively connected to the 1-2 touch electrodes.

4. The electrostatic capacitive touch screen panel of claim 3, wherein the second touch electrodes comprise 2-1 touch electrodes and 2-2 touch electrodes extending in the second direction along the first direction, and
    the electrostatic capacitive touch screen panel further comprise 2-1 main routing wires respectively connected to the 2-1 touch electrodes, and 2-2 main routing wires respectively connected to the 2-2 touch electrodes.

5. The electrostatic capacitive touch screen panel of claim 4, wherein the grounding/floating electrodes comprise first to fourth grounding/floating electrodes extending in the second direction along the first direction, and
    the electrostatic capacitive touch screen panel further comprises first to fourth main grounding/floating wires respectively connected to the first to fourth grounding/floating electrodes.

6. The electrostatic capacitive touch screen panel of claim 5, further comprising a flexible printed circuit including:
    1-1 and 1-2 sub routing wires respectively connected to the 1-1 and 1-2 main routing wires;
    first connecting wires interconnecting the 1-1 sub routing wires and the 1-2 sub routing wires;
    first signal wires respectively connected to the first connecting wires;
    2-1 and 2-2 signal wires respectively connected to the 2-1 and 2-2 main routing wires;
    first to fourth sub grounding/floating wires respectively connected to the first to fourth main grounding/floating wires;
    a 2-1 connecting wire connected to odd-numbered ones of the first to fourth sub grounding/floating wires;
    a 2-2 connecting wire connected to even-numbered ones of the first to fourth sub grounding/floating wires; and
    a second grounding/floating signal wire connected to the 2-2 connecting wire.

7. The electrostatic capacitive touch screen panel of claim 6, wherein when the first grounding/floating signal wire is grounded during the first half of one touch driving period, the second grounding/floating signal wire is allowed to float during the second half of the touch driving period.

8. The electrostatic capacitive touch screen panel of claim 1, wherein the first touch electrodes comprise 1-1 touch electrodes and 1-2 touch electrodes arranged in the second direction along the first direction,
the 1-1 touch electrodes and the 1-2 touch electrodes are connected in the first direction, and
when the even-numbered grounding/floating electrodes are allowed to float and the odd-numbered grounding/floating electrodes are grounded during the first half of one touch driving period, the even-numbered grounding/floating electrodes are grounded and the odd-numbered grounding/floating electrodes are allowed to float during the second half of the touch driving period.

9. The electrostatic capacitive touch screen panel of claim 6, wherein when the first grounding/floating signal wire is allowed to float during the first half of one touch driving period, the second grounding/floating signal wire is grounded during the second half of the touch driving period.

* * * * *